United States Patent
Guyomard et al.

[11] Patent Number: 5,931,353
[45] Date of Patent: Aug. 3, 1999

[54] PLASTIC HOLLOW BODY WITH INTERNAL FASTENING ARRANGEMENT

[75] Inventors: Christophe Guyomard; Saurin Mehta, both of Troy, Mich.

[73] Assignee: Solvay (Société Anonyme), Brussels, Belgium

[21] Appl. No.: 08/848,011

[22] Filed: Apr. 28, 1997

[51] Int. Cl.⁶ .................................................. B67D 5/50
[52] U.S. Cl. ................... 222/385; 417/360; 417/423.15; 220/608
[58] Field of Search .................................. 222/382, 385, 222/377; 417/360, 423.3, 423.15, 363; 220/608; 215/373; 239/152, 153

[56] References Cited

U.S. PATENT DOCUMENTS

| | | |
|---|---|---|
| 2,368,530 | 1/1945 | Edwards . |
| 3,659,965 | 5/1972 | Ebert et al. ............................. 417/363 |
| 3,743,438 | 7/1973 | Colliver et al. ...................... 222/385 X |
| 5,044,526 | 9/1991 | Sasaki et al. ........................ 222/385 X |
| 5,211,547 | 5/1993 | Gaston et al. .......................... 417/360 |
| 5,338,163 | 8/1994 | Frank et al. ............................. 417/360 |

*Primary Examiner*—Kenneth Bomberg
*Attorney, Agent, or Firm*—Venable; George H. Spencer; Catherine M. Voorhees

[57] ABSTRACT

A plastic hollow body for containing liquid, in particular a fuel tank, provided with internal slides, formed in part of its wall when producing it, for the fastening of a module inside the hollow body.

13 Claims, 1 Drawing Sheet

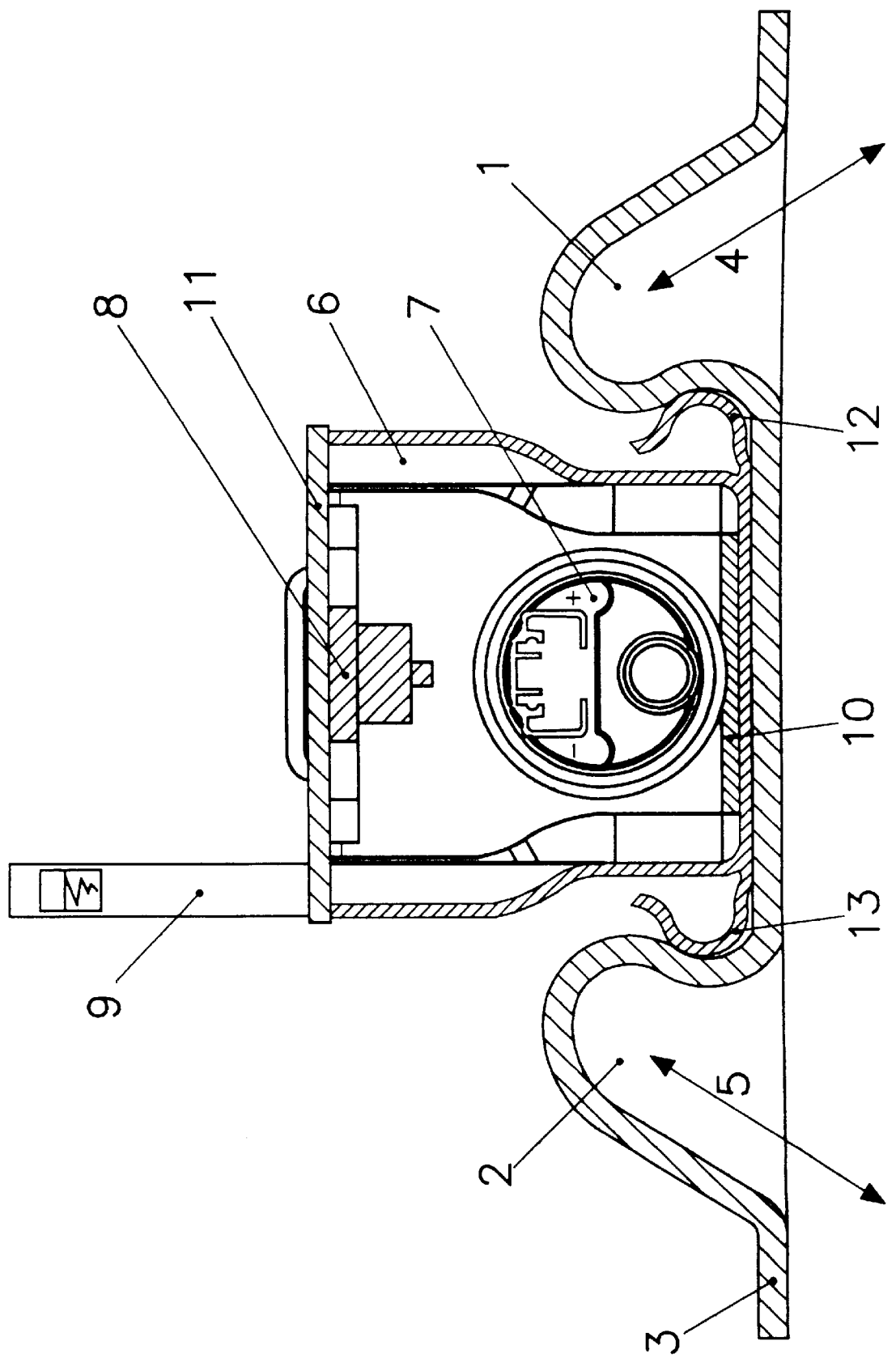

PLASTIC HOLLOW BODY WITH INTERNAL FASTENING ARRANGEMENT

BACKGROUND OF THE INVENTION

1. Field of the Invention

The invention relates to a plastic hollow body with an internal fastening arrangement.

There are numerous cases where it is necessary to provide at least one further element inside a plastic hollow body, e.g. a pumping device for extracting liquid from the hollow body, a reservoir for maintaining a minimum level of liquid in the pumping area and/or a gauge. Advantageously, at least some of these elements are joined together in a module to be secured in a precise position inside the hollow body.

2. Description of the Prior Art

U.S. Pat. No. 5,044,526 teaches a mounting arrangement for mounting a reservoir within a fuel tank wherein the reservoir comprises a projection receivable by engaging clip means in a groove of a bracket fixed to a lower wall of the fuel tank.

According to this mounting arrangement, it is required that an independent bracket be separately produced, handled and fixed to the fuel tank after having produced the fuel tank. This implies that the bracket have dimensions enabling its introduction in the fuel tank by an opening left in the fuel tank. Further, the introduction of the bracket and its fixing in the fuel tank require an independent step which takes additional production time and implies additional production costs. Finally, fixing of the bracket in the fuel tank after production of the fuel tank does not guarantee the precision, reproducibility and safety of this fixing of the bracket or consequently of the fastening of the module.

It clearly appears therefor that such a mounting arrangement remains difficult to realize and of improvable quality.

SUMMARY OF THE INVENTION

The object of the invention is, therefore, to provide a plastic hollow body with associated means enabling an easier, quicker and safer fastening of a module inside the hollow body.

The invention concerns, in a first aspect, a plastic hollow body for containing liquid, provided with internal slides, formed in part of its wall when producing it, for the fastening of a module inside the hollow body.

The hollow body may be of any sort known from a practitioner in the art of containing liquid, selected and adapted to its particular function. For example, it is a bottle or a tank. In particular, it is a tank. More particularly, it is a fuel tank,e.g. for a vehicle such as a car.

The plastic hollow body is essentially made of plastic material. Generally, it is made of thermoplastic material. A thermoplastic material is intended to denote one or more thermoplastic polymers. The polymers may be homopolymers, copolymers or mixtures thereof Polyolefins or vinyl chloride polymers may be adopted, for example, as such polymers. Good results have been obtained from a polyolefin, in particular a polyethylene. Excellent results have been obtained from a high density polyethylene (HDPE). One or more common additives may obviously be added to the plastic material.

The plastic hollow body as a whole may essentially be made of a single plastic material. It may also include, in particular, a number of layers consisting essentially of different plastic materials.

The plastic hollow body may be produced by any process. In particular, it may be produced by extrusion blow-molding, that is in extruding a parison into an open mold, closing the mold and blow molding the hollow body.

The internal slides are formed in part of the wall of the hollow body when producing it. In particular, they are formed by moving at least one movable tool for each slide in order to form inwardly directed projections in the wall of the hollow body, the projections being formed within the wall. From the destination of the plastic hollow body, which is for containing liquid, it is clear that the internal slides formed in part of its wall do not affect the continuity of the wall and do not form any opening in it. When the plastic hollow body is produced by extrusion blow-molding, at least one movable tool for each slide may in particular be comprised in part of the mold and moved from the mold when blowing the parison against the mold so that the parison conforms to the shape of the tool. In this case, any movable tool may advantageously be drawed back in the wall of the mold before removing the hollow body from the mold.

The internal slides are formed in part of the wall of the hollow body. Advantageously, they are formed in part of the bottom wall of the hollow body, for fastening of a module on the bottom of the hollow body.

There are at least two internal slides, for the fastening of the module inside the hollow body. In a particular arrangement, there are two internal slides. Advantageously, the module is slid between the slides.

At least one internal slide is advantageously conceived as or provided with stop means, also formed when producing the hollow body, for a precise positioning of the module in avoiding its introduction too far in the slides.

The internal slides are parallel or not. In a particular arrangement, at least two of them are in convergent direction, at least on part of their length, in such a way that the module may be easily introduced in slides more distant than the size of the module and guided in convergent slides to its fastening final position.

In a second aspect, the invention concerns a hollow body assembly comprising a plastic hollow body for containing liquid, provided with internal slides, formed in part of its wall when producing it, for the fastening of a module inside the hollow body and a module fastened inside said hollow body in said internal slides.

The preferred embodiments of the plastic hollow body are as here above described according to the first aspect of the invention.

The module may comprise different elements. In particular, it comprises a reservoir, where liquid would be directed and collected when only a small amount of liquid remains in the hollow body or in particular dynamic conditions. With the reservoir can be associated, inside or outside the module, means improving collection of the fluid inside the reservoir, e.g. a jet pump. By its function, it is easily understandable that the precise and safe positioning of the reservoir on the bottom part of the hollow body is essential. In a particular arrangement, the module also or alternatively comprises a pumping device, for extracting liquid from the hollow body. Alternatively or additionally, the module comprises filtering means, a pressure regulating device and/or a gauge for measuring and indicating the liquid level in the hollow body. In a specific embodiment, the module at least comprises a reservoir, a gauge and a pumping device.

The module is made of any material known from the practitioner and compatible with the liquid to be contained in the hollow body. Generally, it is essentially made of metal or of plastic material. Good results have been obtained with a module essentially made of plastic material, in particular of polyethylene or polyacetal.

Advantageously, the module is provided with several means for cooperating with the slides in its fastening. These means are generally essentially made of metal or plastic material. They are advantageously essentially made of the same material as the module. In particular, the module is provided with elastic deformable side members for cooperating with slides in its fastening. More particularly, an elastic spring or plate is formed with or attached to the module which cooperates with slides, advantageously inside said slides, when the module is fastened, in avoiding the exit of the module out of the slides and even any relative movement between them except in sliding. Moreover, such elastic deformable side members allow a better and safer positioning of the module in compensating temporary or permanent deformations of the module, of the slides and/or of the hollow body issued from their production process or due to particular working conditions (fuel swelling, temperature, pressure, . . .). The module may be provided with other means attached or integrated for cooperating with the slides in its fastening, for example spring means or elastic means which place in position when the module is completely inserted in the slides and which avoid, when fastened, the undesired removal of the module out of the slides and even any relative movement between them in the sliding direction. However, said means cooperating with the slides when the module is fastened, still allow the intentional removal of the module, for example by manually depressing elastic means.

In order to compensate temporary or permanent deformations of the wall of the hollow body issued from its production process or due to particular working conditions (fuel swelling, temperature, pressure, . . . ) and to ensure easy introduction of the module in the slides, the form of the wall of the hollow body is advantageously adapted locally around or between the internal slides where the module will have to be introduced, for example in the form of a concave shape.

In a third aspect, the invention concerns a method of fastening a module inside a plastic hollow body for containing liquid, comprising inserting said module inside said plastic hollow body through an opening in an upper part of the hollow body and fastening said module by sliding it in slides formed in part of the wall of said hollow body when producing said hollow body.

The preferred embodiments of the plastic hollow body and of the module are as here above described according to first and second aspects of the invention.

In conclusion, the invention allows fastening of a module in a hollow body in slides without any separate step for introducing and fixing the slides inside the hollow body and without any limitation on the dimension of the slides due to the opening left in the hollow body. Moreover, it offers precision, reproducibility and safety in forming of the slides and in fastening of the module. Finally, in case of any problem to the module, the invention allows its easy removal and its immediate substitution or repair independently of the hollow body.

BRIEF DESCRIPTION OF THE DRAWING

The following FIGURE illustrates in a non-limitative way the invention. It shows a fuel tank assembly according to the invention, in a sectional view perpendicular to the internal slides.

DESCRIPTION OF A PREFERRED EMBODIMENT

Two internal slides (1)(2) of parallel directions have been formed in part of the bottom wall (3) of a plastic fuel tank during its blow molding, by moving tools from part of the mold according to the direction of the arrows (4) (5) when blowing the parison against the mold so that the parison conforms to the shape of the tool and forms an indentation inside the fuel tank and by drawing back the movable tools to the mold according to the direction of the arrows (4) (5) before removing the fuel tank from the mold.

A module (6) has been inserted inside the fuel tank through an opening in its upper part and fastened on the bottom of the fuel tank by sliding it between the slides (1)(2).

The module (6) comprises a pumping device (7), a pressure regulating device (8), a gauge (9), a filter (10) and a cover (11).

The module (6) is provided with elastic deformable side members (12)(13) for cooperating with the slides in its fastening. The elastic deformable side members have been formed with the module and are part of it. They cooperate with slides, inside them, in avoiding the exit of the module out of the slides and even any relative movement between them except in sliding.

What is claimed is:

1. A plastic hollow body for containing liquid, provided with internal slides, formed in part of its wall when producing it, for the fastening of a module inside the hollow body.

2. The plastic hollow body according to claim 1, wherein the plastic hollow body for containing liquid is a fuel tank.

3. The plastic hollow body according to claim 1, wherein the plastic hollow body is produced by extrusion blow-molding.

4. The plastic hollow body according to claim 1, wherein the internal slides are formed in part of a bottom wall of the hollow body.

5. A hollow body assembly comprising:
   a plastic hollow body for containing liquid, provided with internal slides, formed in part of its wall when producing it, for the fastening of a module inside the hollow body;
   and a module fastened inside said hollow body in said internal slides.

6. The hollow body assembly according to claim 5, wherein the module comprises a reservoir.

7. The hollow body assembly according to claim 5, wherein the module comprises a pumping device.

8. The hollow body assembly according to claim 5, wherein the module comprises a gauge.

9. The hollow body assembly according to claim 5, wherein the module is provided with elastic deformable side members for cooperating with the internal slides in its fastening.

10. A method of fastening a module inside a plastic hollow body for containing liquid, comprising inserting said module inside said plastic hollow body through an opening in an upper part of the hollow body and fastening said module by sliding it in slides formed in part of the wall of said hollow body when producing said hollow body.

11. A hollow body for containing liquid comprising:

a wall; and internal slides unitarily formed in the wall when producing the hollow body for fastening a module inside the hollow body.

12. The hollow body according to claim 11, wherein the internal slides are inwardly directed projections which are spaced from one another and face each other so that the module can be slid between the internal slides thereby fastening the module to the hollow body.

13. The hollow body according to claim 12, wherein the internal slides converge toward one another.

* * * * *